United States Patent [19]

Stewart

[11] Patent Number: 4,656,873
[45] Date of Patent: Apr. 14, 1987

[54] FLOW MEASURING DEVICE

[76] Inventor: David A. Stewart, 39 Hawthorne Ave., Barrington, R.I. 02806

[21] Appl. No.: 767,176

[22] Filed: Aug. 19, 1985

[51] Int. Cl.$^4$ ............................................. G01F 1/05
[52] U.S. Cl. ............................... 73/861.33; 73/861.79
[58] Field of Search ........... 73/861.33, 861.79, 861.81, 73/861.87, 187

[56] References Cited

U.S. PATENT DOCUMENTS

| 34,060 | 1/1862 | Isham | 73/861.33 |
| 644,487 | 2/1900 | Zumkeller | 73/861.33 |
| 3,162,422 | 12/1964 | Renfrew | 73/861.79 |
| 4,131,017 | 12/1978 | Bach | 73/861.79 |
| 4,489,616 | 12/1984 | Priddy | 73/861.79 |
| 4,507,960 | 4/1985 | Hufnagel | 73/187 |

FOREIGN PATENT DOCUMENTS 0029336  5/1981  European Pat. Off. ......... 73/861.81

Primary Examiner—Herbert Goldstein
Attorney, Agent, or Firm—Salter & Michaelson

[57] ABSTRACT

A paddle-wheel-type flow measuring device comprises a housing having inlet and outlet passages therein, a paddle-wheel rotatably mounted in the housing, and a sensor for sensing the rate of rotation of the paddle-wheel in the housing. The inlet passage of the housing is positioned so that when a fluid flowing in substantially perpendicular relation to the axis of the paddle-wheel passes through the inlet passage, it impinges directly on only one end portion of the paddle-wheel and the outlet passage is positioned so that it can only directly receive fluid from the axially opposite end portion of the paddle-wheel. Hence, a fluid passing through the housing must circulate internally with the paddle-wheel before it can pass out the outlet passage so that a proportionally greater rotational force is applied to the paddle-wheel by the fluid. As a result, the device can be effectively utilized for measuring relatively low fluid flow rates, even in relatively small diameter pipe sections.

8 Claims, 8 Drawing Figures

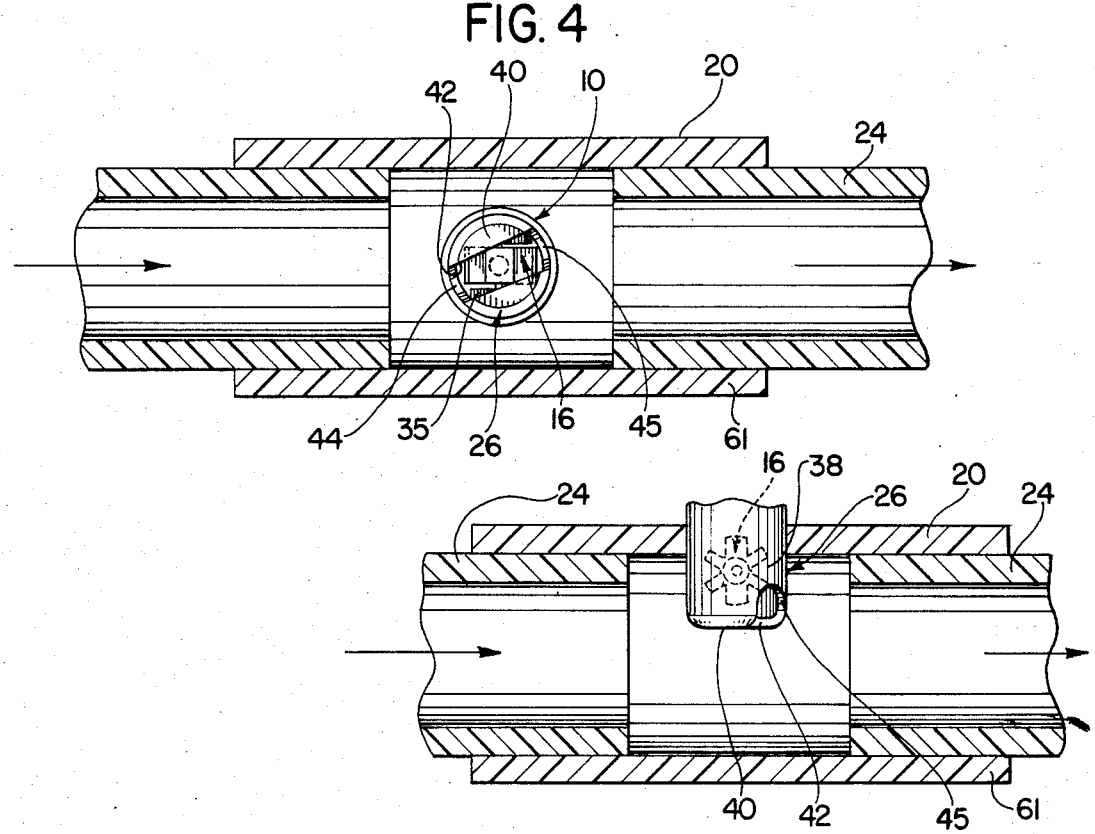
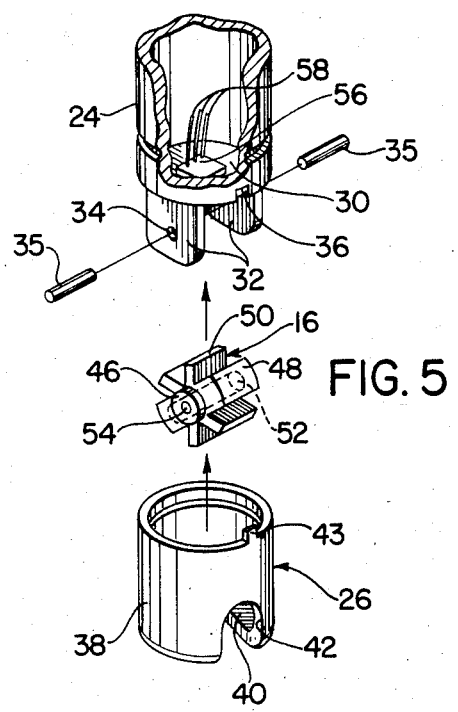

FLOW MEASURING DEVICE

BACKGROUND AND SUMMARY OF THE INVENTION

The instant invention relates to devices for sensing fluid flow rates and more particularly to a device which is operative for sensing very low fluid flow rates in relatively small diameter conduits.

While a wide variety of fluid flow measuring devices have been heretofore available, most of them have been ineffective for measuring very low fluid flow rates in relatively small diameter conduits and pipe sections, such as those having diameters of less than approximately two inches. In this regard, heretofore paddle-wheel-type flow measuring devices have been effectively used for measuring fluid flow rates in many low flow applications. However, it has been found that, while paddle-wheel-type flow measuring devices can be effectively used for measuring relatively low fluid flow rates in relatively large diameter conduits and pipe sections, they generally loose their effectiveness when they are made in miniaturized constructions for use in measuring fluid flow rates in relatively small diameter conduits and pipe sections. This is primarily because as the overall diameter of a paddle-wheel is decreased, the amount of torque which is applied to the paddle-wheel by a fluid as it contacts the paddles or paddle elements thereof is decreased correspondingly, whereas the frictional resistance to the rotation of the paddle-wheel caused by the assembly in which it is mounted remains substantially the same. Accordingly, as the diameter of a paddle-wheel is reduced, the frictional resistance to the rotation of the wheel becomes increasingly significant and, in fact, it has been found that in some instances this frictional resistance can prevent relatively small diameter paddle-wheels from rotating under very low flow conditions and that under other conditions it can cause paddle-wheel-type flow measuring devices to produce erroneous flow readings.

Flow measuring devices representing the closest prior art to the instant invention of which the applicant is aware are disclosed in the U.S. patents to COLEMAN U.S. Pat. No. 1,579,280; DENISON et al U.S. Pat. No. 4,101,874; POUNDER U.S. Pat. No. 4,173,144; ONODA U.S. Pat. No. 4,265,127; LAVIANO et al U.S. Pat. No. 4,379,411; and POUNDER et al U.S. Pat. No. 4,440,030. Of these devices, the ones disclosed in the U.S. Pat. Nos. to POUNDER 4,173,144 and POUNDER et al 4,440,030 are believed to be the most pertinent to the instant invention since they address the problem of measuring very low fluid flow rates. However, since they do not address this problem in the manner of the instant invention and since they do not anticipate the novel structural features of the device of the instant invention, even these references are believed to be of only general interest.

The instant invention provides a novel flow measuring device which is operative for measuring relatively low fluid flow rates in conduits, even conduits having relatively small diameters or sectional dimensions, such as those having sectional dimensions of less than approximately two inches. More specifically, the flow measuring device of the instant invention comprises a housing having an open interior area, a paddle-wheel mounted in the housing and means for sensing the rate of rotation of the paddle-wheel in the housing. The paddle-wheel, which has a central axis, comprises a plurality of paddle elements which extend outwardly relative to the central axis. Further, the paddle-wheel is mounted in the open interior area of the housing so that it is rotatable about its axis and the housing is formed with inlet and outlet passages which extend between the open interior area and the exterior of the housing. The inlet passage of the housing is oriented so that when a fluid which is flowing in generally perpendicular relation to the axis of the paddle-wheel passes through the inlet passage into the open interior area, it impinges directly on the portions of the paddle-wheel which are adjacent a first end thereof but not directly on the portions of the paddle-wheel which are adjacent the axially opposite second end thereof, and the outlet passage is oriented to receive fluid directly from portions of the paddle-wheel which are adjacent the second end thereof but not directly from portions of the paddle-wheel which are adjacent the first end thereof. Accordingly, when a fluid passes through the inlet passage into the open interior area, it impinges directly on the first end portion of the paddle-wheel and it causes the paddle-wheel to rotate about its axis. However, since the fluid can not pass directly from the first end portion of the paddle-wheel to the outlet passage, it circulates with the paddle-wheel in the housing until it is reoriented adjacent the second end portion of the paddle-wheel, whereupon it can escape through the outlet passage as the paddle-wheel rotates further. This internal circulation of fluid in the housing around the paddle-wheel causes the rotational forces which are applied to the paddle-wheel to be increased so that proportionally the effects of the frictional resistance from the assembly in which the paddle-wheel is mounted are diminished. In the preferred embodiment of the device of the instant invention the inlet and outlet passages are laterally offset with respect to each other to assure that fluid from the inlet passage impinges on the first end portion of the paddle-wheel but not on the second end portion thereof and to assure that the outlet passage is positioned to receive fluid from the second end portion of the paddle-wheel but not from the first end portion thereof. Further, in the preferred embodiment the housing is constructed so that when fluid passes from the inlet passage through the interior area to the outlet passage, it circulates at least an entire revolution around the axis of the paddle-wheel and the housing preferably confines the fluid in the interior area so that a substantial portion of the fluid rotates with the paddle-wheel. In one embodiment of the device, the housing is constructed so that the open interior area has a substantially circular sectional configuration and the paddle-wheel is mounted so that the axis thereof is in substantially diametric relation in the open interior area. In this embodiment of the device, the housing comprises a longitudinally extending sidewall portion which defines the circular periphery of the interior area and an end wall which defines an end of the interior area. Further, a slot is formed in the housing which extends through the end wall and the adjacent end portions of the side wall portion in substantially diametric relation to the circular interior area, the slot preferably being disposed at an angle of between approximately 60° and 80° with respect to the axis of the paddle-wheel. For use of this embodiment of the device, it is preferably mounted in a pipe section so that the housing extends inwardly a distance into the interior of the pipe section from a peripheral side wall thereof and the paddle-wheel is preferably oriented so that the axis thereof is substantially perpendicular to the axis of the pipe section. It has been found that when the device of the instant invention is constructed and mounted in this manner it can be effectively embodied in miniaturized constructions and it can be utilized for measuring relatively low flow rates in relatively small diameter pipes and conduits. In particular, when the device is constructed and mounted in the manner hereinabove set forth, and it is subjected to a flow of fluid, a substantial portion of the fluid circulates around the paddle-wheel in the interior area of the housing so that the rotational forces applied to the paddle-wheel are substantially increased. This allows the paddle-wheel of the device to effectively overcome the frictional resistance caused by the assembly in which it is mounted so that the device can be effectively utilized for measuring relatively low flow rates in even small diameter conduits.

Accordingly, it is a primary object of the instant invention to provide an effective device for measuring relatively low rates of fluid flow.

Another object of the instant invention is to provide an effective device which can be utilized for measuring low fluid flow rates in relatively small diameter pipe sections and conduits.

Another object of the instant invention is to provide a flow measuring device comprising a housing and a paddle-wheel mounted in the housing, wherein fluid passing through the housing circulates around the paddle-wheel to apply increased rotational forces thereto.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 3 is a sectional view taken along line 3—3 in FIG. 1;

FIG. 4 is a sectional view taken along line 4—4 in FIG. 1;

FIG. 5 is an exploded perspective view of the first embodiment of the device;

DESCRIPTION OF THE INVENTION

Figure 1:
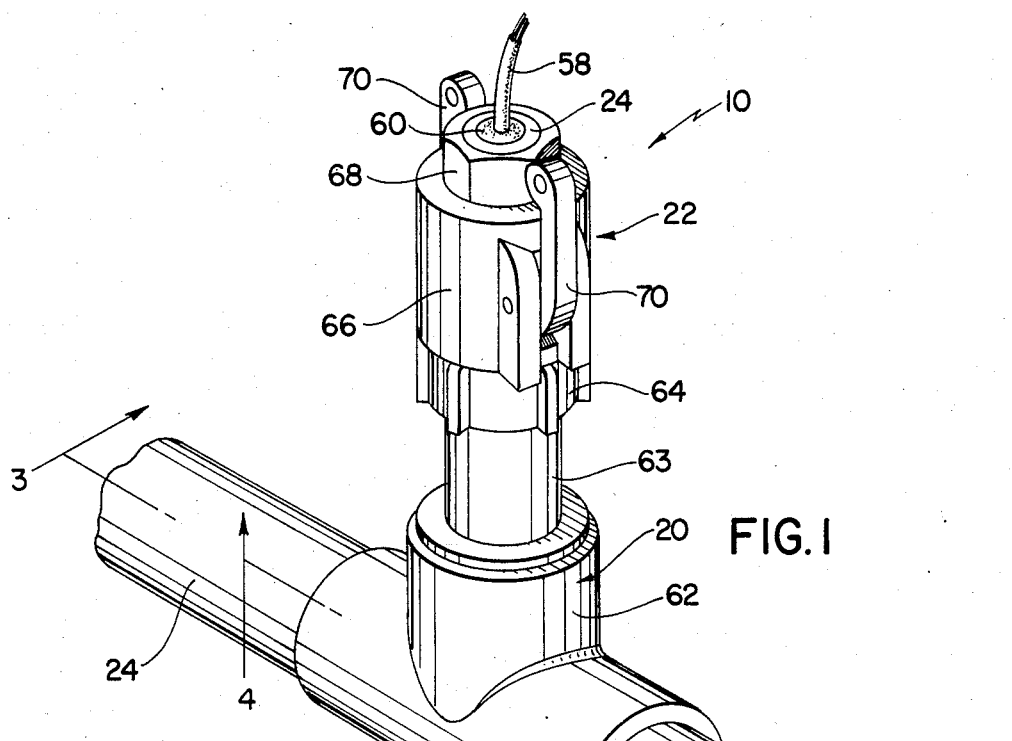
FIG. 1 is a perspective view of a first embodiment of the device of the instant invention mounted in a pipe section.
Figure 2:
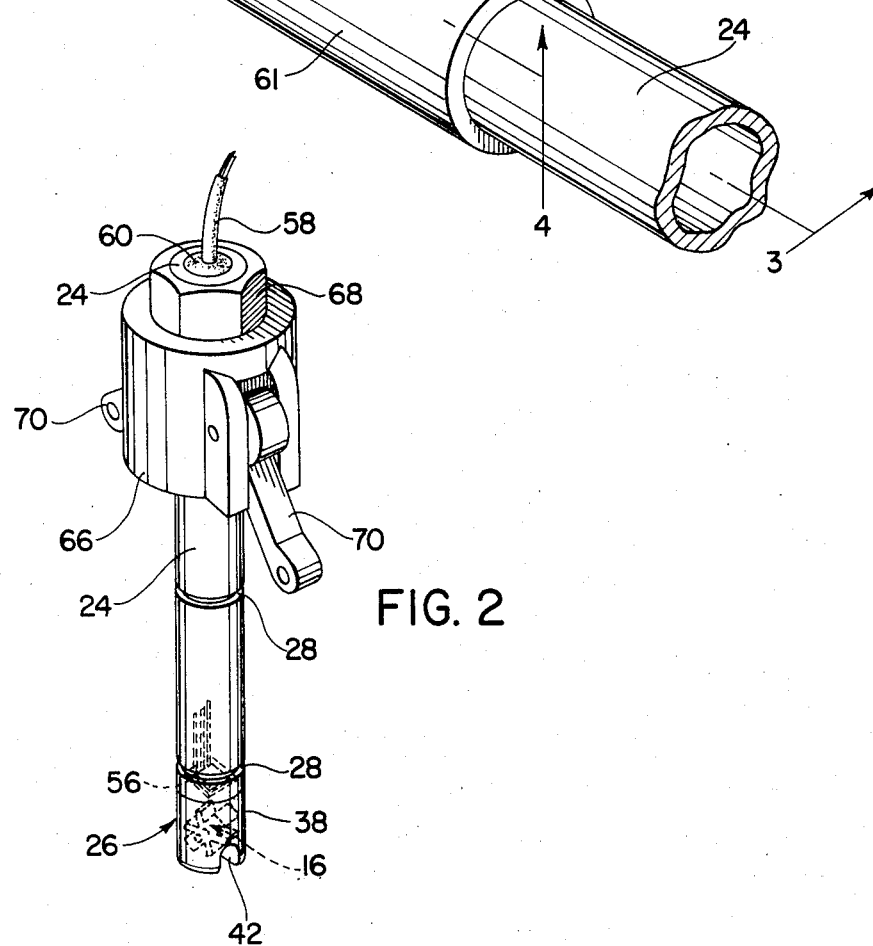
FIG. 2 is a perspective view of the first embodiment of the device in combination with a mechanism for mounting it in a pipe section.
Figure 6:
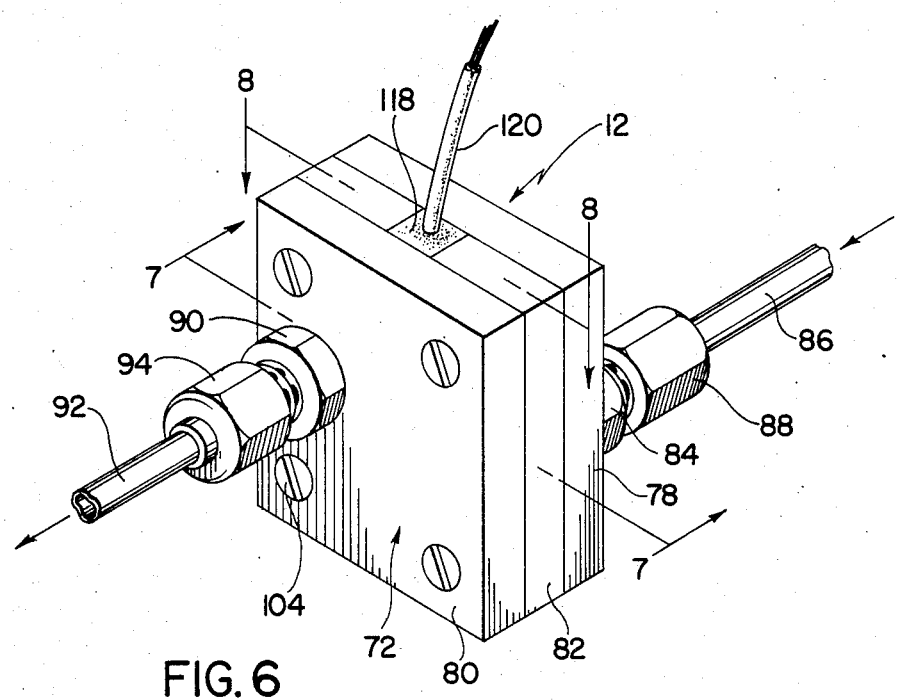
FIG. 6 is a perspective view of a second embodiment of the device.
Figure 7:
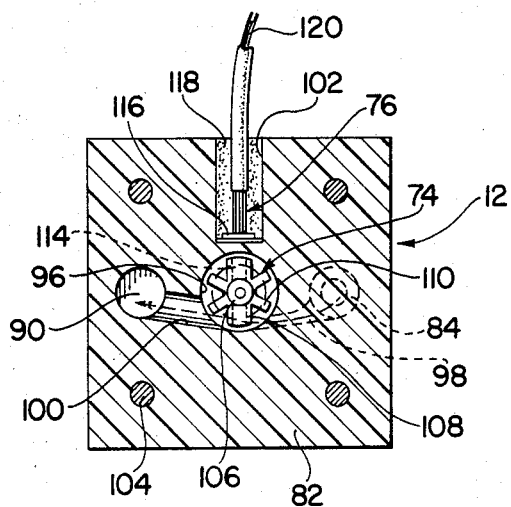
FIG. 7 is a sectional view taken along line 7—7 in FIG. 6.
Figure 8:
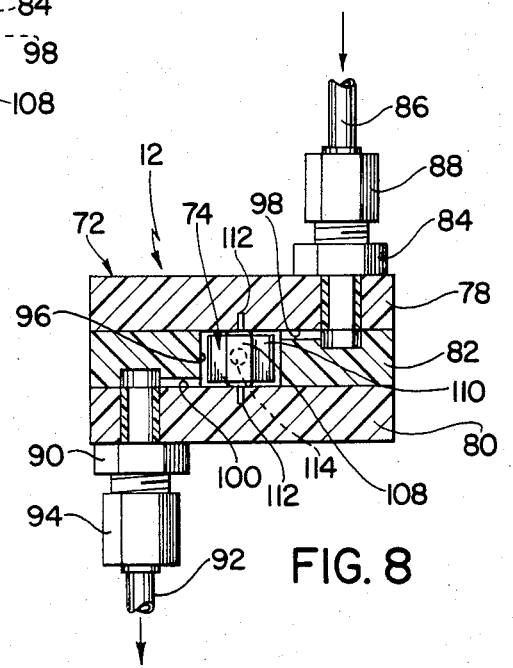
FIG. 8 is a sectional view taken along line 8—8 in FIG. 6.

Referring now to the drawings, a first embodiment of the device of the instant invention is illustrated in FIGS. 1-5 and generally indicated at 10 and a second embodiment of the device is illustrated in FIGS. 6-8 and generally indicated at 12. The devices 10 and 12 are operative for sensing relatively low fluid flow rates and they are particularly effective for sensing fluid flow rates in relatively small conduits or pipe sections, such as those having sectional dimensions or diameters of less than approximately two inches. In this regard, however, it will be understood that while the devices 10 and 12 are particularly effective for use in measuring relatively low fluid flow rates in conduits and pipe sections having relatively small sectional dimensions, it will be understood that the use of both of the devices 10 and 12 for measuring a wide range of fluid flow rates in conduits and pipe sections of various dimensions is contemplated.

Referring now to FIGS. 1-5, the device 10 comprises an elongated tubular housing generally indicated at 14, a paddle-wheel generally indicated at 16 which is rotatable mounted in the housing 14, and a sensor unit generally indicated at 18 which is operative for sensing the rate of rotation of the paddle-wheel 16 in the housing 14. The device 10, as herein set forth, is adapted to be mounted in a T-shaped pipe fitting or pipe section generally indicated at 20 with a mounting assembly 22, and the pipe fitting 20 is connected to a pair of tubular pipe elements 24. Accordingly, when the device 10 is mounted in the pipe fitting 20, it is operative for measuring the rate of flow of a fluid passing through the pipe fitting 20 and the pipe elements 24.

The housing 14 comprises an elongated tubular member which is preferably made of a suitable, durable, corrosion resistant material, such as KYNAR (Pennwalt TM) which also provides effective bearing surfaces for mounting the paddle-wheel 16 therein in a manner which will hereinafter be set forth. The housing 14 comprises a stem-portion 24 and a main portion 26 which is received in substantially aligned relation on the end of the stem portion 24. The stem portion 24 is of elongated tubular configuration and it has a pair of spaced annular grooves 28 formed therein for receiving O-ring seals (not shown) thereon. The stem portion 24 has a terminal end wall 30 and a pair of spaced paddle-wheel mounting tabs 32 having apertures 34 therein extend longitudinally from the terminal end wall 30 for mounting the paddle-wheel 16 therebetween with a pair of mounting pins 35, and an alignment notch 36 is formed in the stem portion 24 adjacent the end wall 30. The main portion 26 comprises a tubular member of reduced length having a substantially circular sectional configuration and having a side wall portion 38 and a rounded end wall portion 40. Extending in substantially diametric relation through the end wall portion 40 and the adjacent portion of the side wall portion 38 is a slot 42 and an alignment tab 43 projects from the opposite end of the main portion 26. The paddle-wheel mounting tabs 32 and the main portion 26 are formed so that when the main portion 26 is received on the end of the stem portion 24, the tabs 32 engage the inner surfaces of the main portion 26 to frictionally retain it in assembled relation with the stem portion 24. Further, the stem portion 24 and the main portion 26 are constructed so that when they are received in assembled relation, the alignment tab 43 is received in the alignment notch 36 to maintain the main portion 26 in aligned nonrotatable relation with the stem portion 24. In this regard, as will be seen most clearly from FIG. 4, when the main portion 26 is assembled with the stem portion 24 in this manner and the paddle-wheel 16 is mounted betwen the tabs 32, the axis of the paddle-wheel 16 is angularly disposed with respect to the diametric extent of the slot 42 across the interior area of the main portion 26. More specifically, the slot 42 is oriented so that it is disposed at an angle of between 60° and 80° with respect to the axis of the paddle-wheel 16 and preferably at an angle of approximately 70° with respect thereto. Accordingly, when the device 10 is mounted in a conduit and the paddle-wheel 16 is exposed to a fluid flow, wherein the direction of fluid flow is approximately perpendicular to the axis of the paddle-wheel 16, the slot 42 defines laterally offset inlet and outlet passages 44 and 45, respectively where it passes through diametrically opposite portions of the side wall portion 38. In this connection, as illustrated in FIG. 4, the slot 42 is preferably formed so it increases in width slightly from the portion thereof that defines the inlet passage 44 to the portion thereof that defines the outlet passage 45, whereby the outlet passage 45 has a slightly greater width than the inlet passage 44. Further, the main portion 26 is dimensioned and configured so that when the paddle-wheel 16 is mounted therein, the walls of the main portion 16 somewhat confine a fluid received therein so that the fluid is maintained in communication with the paddle-wheel 16.

The paddle-wheel 16 is most clearly illustrated in FIG. 5 and it is preferably also made of a suitable durable, corrosion resistant plastic material. The paddle-wheel 16 comprises a central core 46 and a plurality of magnetic and nonmagnetic paddle elements 48 and 50, respectively, which extend substantially radially outwardly from the core 46. In this regard, the paddle-wheel 16, as herein embodied comprises a pair of the magnetic paddle elements 48 which are of enlarged dimension and extend substantially radially outwardly in diametrically opposite directions from the core 46, and a magnetic element 52 is embedded in the magnetic paddle elements 48 so that opposite poles of the magnetic element 52 are disposed adjacent diametrically opposite portions of the paddle-wheel 16. The nonmagnetic paddle elements 50 also extend substantially radially outwardly form the core 46 and they are positioned at substantially uniform angular intervals between the magnetic paddle elements 48. Bores 54 extend axially inwardly from opposite ends of the core 46 for rotatably mounting the paddle element 16 between the tabs 32 with the mounting pins 35.

The sensor unit 18 comprises the magnetic element 52 which is mounted in the paddle-wheel 16 in the manner hereinabove set forth and a "Hall effect" sensor 56 which is received in the tubular stem portion 24 and positioned adjacent the end wall 30. The "Hall effect" sensor 56 is electrically connected to wires 58, and the stem portion 24 is preferably filled with a conventional potting fill 60 to seal and retain the sensor 56 therein. When the sensor 56 is mounted in the stem portion 24 in this manner, it is responsive to the rotation of the paddle-wheel 16 about its axis and, in particular, it is responsive to the magnetic element 52 as the opposite ends thereof pass in close proximity to the sensor element 56. More specifically, as the opposite ends of the element 56 pass by the sensor element 56, they alternatively open and close a switching circuit in the element 56 and, as a result, a signal is produced in the wires 58 which is indicative of the rate of rotation of the paddle-wheel 16. Accordingly, by connecting the wires 58 to an appropriate conventional indicating device, the rate of rotation of paddle-wheel 16 can be effectively monitored and this can be calibrated to provide indications of actual fluid flow rates by conventional techniques.

The pipe fitting 20 comprises a conventional T-shaped pipe fitting comprising a main portion 61 and a T portion 62, and the mounting assembly 22 comprises a conventional cam-lever mounting assembly which is operative for detachably mounting the device 10 in the pipe fitting 20. More specifically, the mounting assembly 22 comprises a tubular section 63 which is permanently secured to the pipe fitting 20, a base portion 64 which is secured on the tubular section 63, and a coupling portion 66 which is permanently secured on the end of the stem portion 24 by means of a threaded nut 68, the nut 68 being threadedly received thereon. The coupling portion 66, comprises a pair of cam-type clamping arms 70 which are operative so that they cooperate with the base portion 64 in a camming relation for clampingly securing the coupling portion 66 in coupled engagement with the base portion 64 in order to secure the device 10 in the pipe fitting 20 in the manner illustrated in FIG. 1.

As will be seen from FIGS. 3 and 4, when the device 10 is mounted in the pipe fitting 20 in the manner hereinabove described, the main portion 26 projects inwardly into the interior of the tubular passage defined by the main portion 61 of the pipe fitting 20 so that the axis of the paddle-wheel 16 is substantially perpendicular to the longitudinal extend of the main portion 61 of the fitting 20. Further, when the device 10 is mounted in this manner, the slot 40 is angularly disposed with respect to the longitudinal extent of the main portion 61 of the fitting 20 at an angle of approximately 20°, so that a fluid passing through the main portion 61 and through the inlet passage 44 initially contacts or impinges directly on only one end portion of the paddle-wheel 16. Accordingly, the fluid circulates internally in the housing main portion 26 and it rotates with the paddle-wheel 16 until it is disposed adjacent the axially opposite end portion of the paddle-wheel 16, whereupon it can pass through the outlet portion 45 of the slot 42. As a result of the internal circulation of fluid around the axis of the paddle-wheel 16 in housing 26, the amount of momentum which is transferred to the paddle-wheel 16 from the fluid is increased so that paddle-wheel 16 will rotate, even under low flow conditions. Accordingly, the device 10 has an increased responsiveness to low fluid flow rates, even when it is constructed in reduced dimensions for use in relatively small diameter pipe sections.

Referring now to FIG. 6–8, the device 12 is clearly illustrated. In this regard, the device 12 comprises a housing generally indicated at 72, a paddle-wheel generally indicated at 74, and a sensor unit generally indicated at 76. The device 12 is constructed to provide increased circulation of a fluid around the paddle-wheel 74 so that it is responsive to relatively low fluid flow rates, even when it is made in relatively small dimensions.

The housing 72 is preferable made of a suitable corrosion resistant plastic material and it comprises first and second side plates 78 and 80, respectively, and a center plate 82, which is interposed between side plates 78 and 80. An inlet fitting 84, to which an inlet tube 86 is connected by means of a connector fitting 88, extends through the first plate 78 and an outlet fitting 90, to which an outlet tube 92 is connected by means of a connector 94, extends through the second plate 72. An inner chamber 96 is formed in the center plate 82 and inlet and outlet passages 98 and 100, respectively, are formed in the center plate 82, so that they provide communication between the inlet and outlet fittings 84 and 90, respectively, and the chamber 96. In this regard, however, as will be seen from FIG. 8, the inlet and outlet passages 98 and 100 are defined by channels or slots in opposite sides of the center plate 82 and their respective adjacent plates 78 and 80 and, as a result, they are laterally offset with respect to each other and they communicate with axially opposite side portions of the chamber 96. The chamber 96 is preferably formed in a substantially cylindrical configuration and a sensor unit slot 102 is formed in the center plate 82 so that it extends inwardly from one peripheral edge thereof to a point closely spaced from the circumferencial periphery of the chamber 96. The housing 72 is maintained in assembled relation with screws 104 which retain the plates 78 and 80 in sealed relation with the center plate 82 so they cooperate to define the inlet and outlet passages 98 and 100 and the chamber 96.

The paddle-wheel 74 is similar in construction to the paddle-wheel 16 and it comprises a core portion 106 and a plurality of magnetic and nonmagnetic paddle elements 108 and 110, respectively, which extend substantially radially outwardly from the core portion 106. The paddle-wheel 74 is mounted in the chamber 96 in substantially coaxial relation therewith by means of axial mounting pins 112, and it includes a magnetic element 114 which is mounted in the magnetic paddle-wheel elements 108 in substantially diametric relation to the paddle-wheel 74.

The sensor unit 76 comprises the magnetic element 114 and a "Hall effect" sensor 116 which is similar to the sensor 56. The sensor 116 is mounted in the slot 102 so that it is positioned in closely spaced relation to the circumferential periphery of the chamber 96 and the slot 102 is filled with a potting fill 118 to seal and retain the sensor 108 therein 110. The "Hall effect" sensor 116 is electrically connected to wires 120 which are connectable to a conventional indicating device for indicating the rate of rotation of the paddle-wheel 74 in the chamber 96.

For use of the device 12, a fluid is passed through the inlet fitting 84 and the inlet passage 98 so that it impinges on the paddle-wheel 74 and circulates therewith in the chamber 96, and eventually the fluid escapes through the outlet passage 100 and the outlet fitting 90. In this regard, because the inlet passage 98 is laterally offset from the outlet passage 100, and because of the position of the paddle-wheel 74 in the chamber 96, a fluid passing through the inlet passage 98 only impinges directly on one end portion of the paddle-wheel 74. This causes the fluid to rotate in the chamber 96 with the paddle-wheel 74 until the fluid is laterally moved toward the opposite end portion of the paddle-wheel 74 so that it can escape through the outlet passage 100. As a result, substantially increased communication between the fluid and the paddle-wheel 74 is achieved and a substantially increased amount of momentum is transferred to the paddle-wheel 74. Because of this effect, the paddle-wheel 74 has a substantially increased responsiveness to relatively low fluid flow rates and the effects of the frictional resistance on the rotation of the paddle-wheel 74 are proportionally diminished. Hence, even when the paddle-wheel 74 is constructed in reduced dimensions it can still provide effective indications of fluid flow rates.

It is seen therefore that the instant invention provides an effective means for measuring relatively low fluid flow rates in conduits. Because the devices 10 and 12 are constructed so that the respective inlet and outlet passages thereof are laterally offset with respect to each other, and because the respective inlet and outlet passages thereof are positioned adjacent opposite end portions of their respective paddle-wheels 16 and 74, increased communication between the paddle-wheels 16 and 74 and fluids passing through the devices 10 and 12 is achieved. As a result, the devices 10 and 12 have substantially increased responsiveness to relatively low fluid flow rates so that they can be constructed in relatively small dimensions without diminishing their effectiveness. Hence, for these reasons as well as the other reasons hereinabove set forth, it is seen that the instant invention represents a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A device for measuring the rate of flow of a fluid comprising a paddle-wheel having a central axis and a plurality of paddle elements which extend outwardly relative to said central axis, said paddle-wheel having axially opposite first and second end portions, an elongated housing having an open interior area and havng a substantially longitudinally extending side wall portion which defines the side periphery of said interior area and having an end wall portion which defines an end of said interior area, said paddle-wheel being mounted in said interior area so that the axis of said paddle-wheel is substantially perpendicular to the longitudinal extent thereof and so said paddle-wheel is rotatable about its axis, said housing having a slot therein which extends through said end wall portion in substantially transverse relation to said interior area, said slot being angularly disposed with respect to said paddle-wheel axis and defining both inlet and outlet passages in said housing.

2. A device for measuring the rate of flow of a fluid comprising a paddle-wheel having a central axis and a plurality of paddle elements which extend outwardly relative to said central axis, said paddle-wheel having axially opposite first and second end portions, a housing having an open interior area of substantially circular cross section, said paddle-wheel being mounted in said interior area so that the axis of said paddle wheel is substantially diametrically disposed therein and so that said paddle wheel is rotatable about its axis, said housing having a substantially longitudinally extending side wall portion which defines the substantially circular periphery of said interior area and having an end wall portion which defines an end of sid interior area, said housing having a slot therein which extends through said end wall portion and through the adjacent portions of said side wall portion in substantially diametric relation to said substantially circular interior area, said slot being angularly disposed with respect to said paddle-wheel axis and defining both inlet and outlet passages in said housing, said inlet passage being oriented so that when a fluid flowing in a direction substantially perpendicular to the axis of said paddle-wheel passes through said inlet passage into said interior area, at least a portion of said fluid impinges directly on said paddle-wheel first end portion, but so that said fluid does not impinge directly on said paddle-wheel second end portion, said outlet passage being oriented to receive fluid directly from said paddle-wheel second end portion but not directly from said paddle-wheel first end portion, and means for determining the rate of rotation of said paddle-wheel about said axis.

3. In the device of claim 2, said slot being disposed at an angle of between 60° and 80° with respect to said paddle-wheel axis.

4. In the device of claim 3, said slot being disposed at an angle of approximately 70° with respect to said paddle-wheel axis.

5. The device of claim 4, in combination with a pipe section having a longitudinally extending peripheral wall and having a central axis, said housing extending substantially transversely into said pipe section from said pipe section peripheral wall, said paddle-wheel being disposed in said pipe section, said paddle-wheel axis being substantially perpendicular to said pipe section central axis.

6. In the device of claim 5, said housing end wall being spaced from said pipe section peripheral wall.

7. In the device of claim 2, the end of said interior area defined by said housing end wall portion being of rounded configuration.

8. In the device of claim 2, said housing having a second end wall portion which defines a second end of said interior area, the outer extremities of said paddle elements passing in closely adjacent spaced relation to both said first end wall portion and said second end wall portion upon rotation of said paddle-wheel in said housing.

* * * * *